United States Patent

[11] 3,603,333

| [72] | Inventor | Carl M. Anderson |
| | | Syracuse, N.Y. |
| [21] | Appl. No. | 854,082 |
| [22] | Filed | Aug. 29, 1969 |
| [45] | Patented | Sept. 7, 1971 |
| [73] | Assignee | Carrier Corporation |
| | | Syracuse, N.Y. |

[54] PRESSURE RELIEF VALVE
4 Claims, 4 Drawing Figs.

| [52] | U.S. Cl. | 137/70 |
| [51] | Int. Cl. | F16k 17/14 |
| [50] | Field of Search | 220/89 A; 137/67–71, 53 |

[56] References Cited

UNITED STATES PATENTS

| 2,487,104 | 11/1949 | Cooper | 220/89 A |
| 2,932,308 | 4/1960 | Erb | 137/70 |
| 3,443,572 | 5/1969 | Lavigne et al. | 137/70 |

FOREIGN PATENTS

| 86,649 | 12/1921 | Austria | 137/70 |
| 604,834 | 9/1960 | Canada | 137/70 |

Primary Examiner—M. Cary Nelson
Assistant Examiner—Richard Gerard
Attorneys—Harry G. Martin, Jr. and Raymond Curtin ABSTRACT: The complete blowdown-type relief valve disclosed is intended especially for use in low-pressure systems. The valve employs a shearpin mechanism for holding the valve closed. A spring is interposed between the valve and the shearpin mechanism and serves, prior to the shearing of the pin, to yieldingly force the valve into sealing engagement with the valve seat. This arrangement prevents fluttering movement or chattering of the valve and variable forces on the shearpin, due to fluctuations in the pressure against the valve.

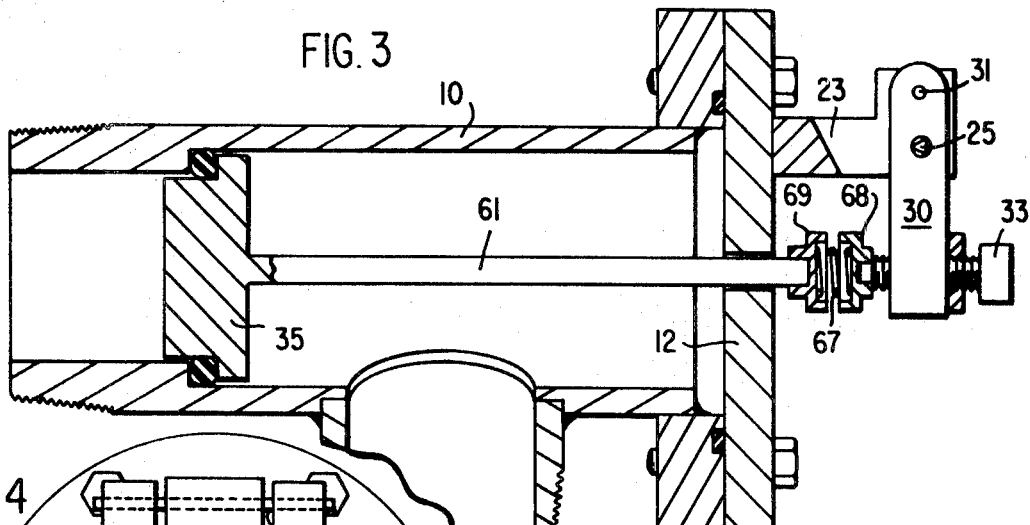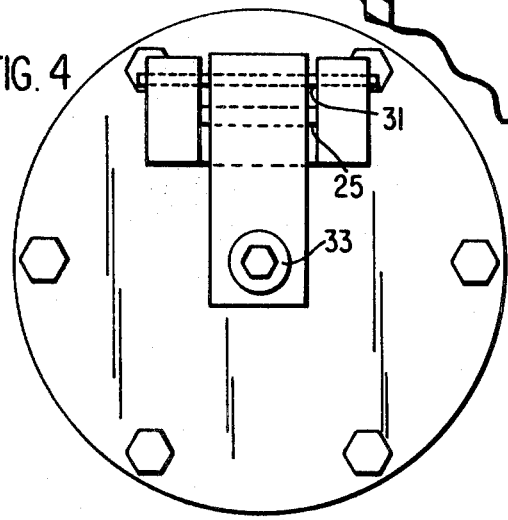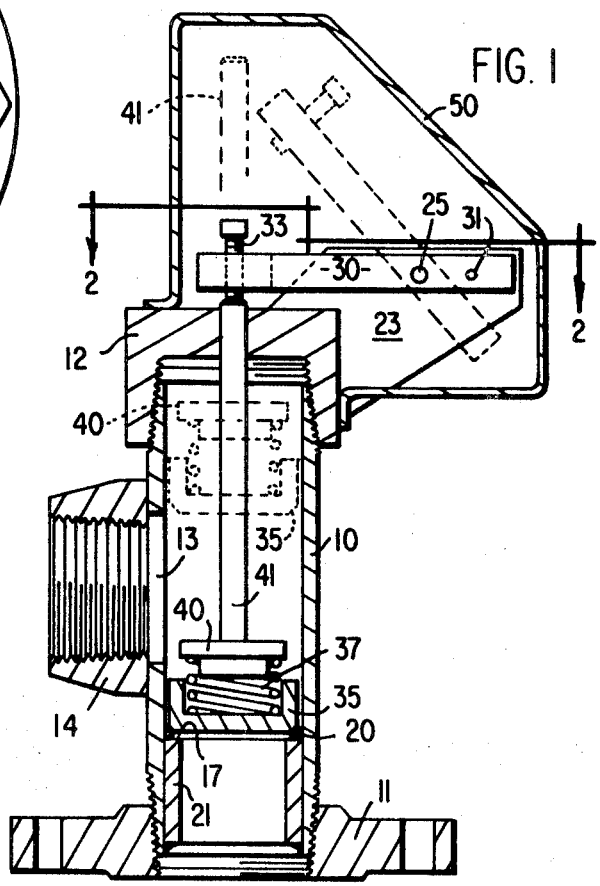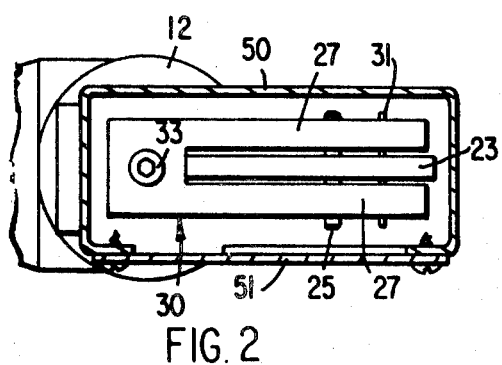

PRESSURE RELIEF VALVE

BACKGROUND OF THE INVENTION

Complete blowdown relief valves have embodied a shearpin arrangement for releasing the valve. In such valves, the pressure is applied directly against the shearpin and accordingly, such valves have not been used in low-pressure systems due to the difficulty in consistently producing shearpins having a uniform low shear strength. Also, such valves have not provided for the elimination of chattering of the valve on the seat in installations wherein the applied pressure fluctuates. Accordingly, it is common practice in low-pressure systems to provide a safety valve in the form of a rupturable diaphragm. Such devices are costly and have to be replaced when they rupture. The more serious objection is that they do not consistently release at a specified pressure.

This invention has as an object a complete blowdown relief valve particularly suitable for use in low-pressure systems and embodying a structure which consistently releases at a selected pressure, the valve in operation being free from chatter; and upon operation, the valve can be reactivated at nominal cost.

SUMMARY OF THE INVENTION

The valve is held against the seat by a movable member such as a pivoted lever, movement of which is prevented by the shearpin. A spring is positioned between the movable member and the valve, and serves to yieldingly press the valve in sealing engagement with the seat. In the arrangement disclosed, a stem extends from the lever to the valve and the spring is interposed between the stem and the lever or between the stem and the valve. The engagement between the stem and the lever is by way of an adjusting screw. In both spring arrangements, there is stop means. The adjusting screw in the lever is threaded in until engagement of the stop means, and then is backed off slightly to permit the spring to exert its yielding force against the valve.

BRIEF DESCRIPTION OF THE DRAWINGS

FIG. 1 is a vertical, sectional view of a relief valve embodying my invention;

FIG. 2 is a view taken on line II—II of FIG. 1;

FIG. 3 is a view similar to FIG. 1 illustrating a modified form of the invention; and FIG. 4 is a top plan view of the valve shown in FIG. 3 looking to the left in that Figure.

DESCRIPTION OF THE PREFERRED EMBODIMENT

Referring to FIG. 1, the body of the valve includes a cylindrical section 10 provided at its ends with external threads. A mounting flange 11 is threaded on one end of the sleeve and a cap 12 is threaded on the opposite end. The sleeve is formed intermediate its ends with an outlet port 13 provided with an internally threaded hub 14 for connection to a discharge pipe.

The valve seat is in the form of a shoulder 17 on which is positioned a sealing gasket in the form of O-ring 20. The shoulder 17 is shown as the upper end of a sleeve 21, fixedly mounted, as by welding, in the lower end of the outer body sleeve 10. The interior of the seat sleeve 21 forms the inlet port, and the passage for the flow of fluid when the valve is opened.

In further reference to FIG. 1 and FIG. 2, a bracket 23 is fixed to the cap 12, as by welding, and extends radially therefrom. The bracket is formed with an aperture to receive a pivot pin 25 which also extends through the leg portions 27 of a lever 30. The lever 30 is bifurcated to provide the leg portions 27 which straddle the bracket 23 (see FIG. 2). The bracket 23 and the lever 30 are also provided with a second set of aligned apertures to receive a shearpin 31. The lever 30 extends from the pivot pin 25 diametrically across the cap 12 and is provided with an adjusting screw 33.

The valve 35 is in the form of a cylindrical cup-shaped member with the recessed side facing upwardly to receive a helical compression spring 37. The upper end of the spring 37 is positioned on a shouldered collar 40 fixedly secured to the lower end of a stem 41. The upper end of the stem 41 is slidably mounted in an aperture located centrally in the cap 12 and the adjusting screw 33 is arranged in axial alignment with the upper end of the stem for engagement therewith.

Initially, the screw 33 is threaded into the lever 30 effecting downward movement of the stem 41 against the action of the spring 37. The screw is tightened until the collar 40 engages the upper edge of the valve, this arrangement serving as a stop means. The screw 33 is then backed off a specified amount such as a quarter turn or one half-turn. This permits the spring 37 to exert a yielding force against the valve 35 maintaining the valve in sealing engagement with the seat to the O-ring 20.

With the spring thus under compression, the upper end of the stem 41 is maintained in tight engagement with the adjusting screw 33 and a preload force is applied to the shearpin 31. In other words, the parts of the valve-restraining mechanism are held in tight engagement. Any fluctuation in the pressure being applied against the bottom of the valve 35, at a value less than that required to effect shearing of the shearpin, will not cause fluttering or chattering of the valve or vibration of the valve-restraining mechanism. Accordingly, even with pulsating applied pressure, the valve remains quiet in operation.

In order to avoid the possibility of shearing the shearpin during the initial adjustment of valve, the serviceman may insert a high shear strength pin in the bracket and lever; and after making the proper adjustment by screw 33, he can remove the installation pin and insert the proper shearpin. He can readily do this by manually depressing the outer end of the lever.

Preferably, a sheet metal housing 50 is fixedly secured to the cap 12. One side of the housing 50 is open and a closure plate 51 is provided for closing the opening. The housing 50 serves to protect the valve-restraining mechanism, and it also provides a convenient storage compartment for extra shearpins and extra O-rings 20.

Referring to FIG. 3, the stem 61 is fixedly secured to the valve 35; and the helical compression spring 67 is interposed between the upper end of the stem and the adjusting screw 33. The spring 67 is positioned in a recessed collar 68 mounted on the adjusting screw 33 and a confronting recessed collar 69 positioned on the upper end of the stem 61. It will be apparent that the spring 67 functions in the same manner as the spring 37. Also, the valve arrangement shown in FIGS. 3 and 4 would be provided with a housing similar to the housing 50.

In the form shown in FIGS. 3 and 4, the screw 33 is threaded into the lever until the annular flanges of collars 68, 69 engage. The screw is then backed off the desired extent. Upon the application of pressure against the valve, sufficient to shear the pin 31, the lever will swing about pivot pin 25 to the position shown in dotted line (FIG. 1), permitting the valve and stem to move from the seat for discharge of fluid through the outlet 13.

While I have described a preferred embodiment of my invention, it is to be understood the invention is not limited thereto since it may be otherwise embodied within the scope of the following claims.

I claim:

1. A pressure relief valve comprising a body formed with inlet and outlet ports; a valve seat located intermediate said ports; a flow passage extending through said seat from said inlet port to said outlet port; a valve movable axially into and out of operative relation with said seat for closing and opening said passage; valve-restraining means carried by said body and operable to restrain movement of said valve from said seat, said valve-restraining means including a shearpin, said shearpin being shearable upon application of pressure of predetermined value at said inlet port for movement of said valve from said seat, said valve-restraining means also including a spring disposed intermediate said valve and shearpin and operable, prior to the shearing of said pin, to exert a yielding force on said pin and on said valve to maintain the same in sealing engagement with said seat, said valve-restraining means being also provided with an adjusting screw operable to vary the value of said yielding force.

2. A pressure relief valve comprising a body formed with inlet and outlet ports; a valve seat located intermediate said ports; a flow passage extending through said seat from said inlet port to said outlet port; a valve movable axially into and out of engagement with said seat for closing and opening said passage, a bracket fixed to said body; a lever pivotally mounted on said bracket; a shearpin engaging said lever and bracket for restraining pivotal movement of said lever; an adjusting screw carried by said lever; force-transmitting means including a spring interposed between said screw and said valve and operable to exert a yielding sealing engagement between said valve and seat, said shearpin being shearable upon application of pressure of predetermined value against said valve at said inlet port to permit pivotal movement of said lever and movement of said valve from said seat.

3. A pressure relief valve as set forth in claim 2 including a stem extending from said valve toward said lever and said spring interposed between the end of said stem and said adjusting screw.

4. A pressure relief valve as set forth in claim 2 including a stem extending from said valve to said screw and a helical compression spring interposed between said stem and said valve.